US006868992B2

(12) United States Patent
Lasry

(10) Patent No.: US 6,868,992 B2
(45) Date of Patent: Mar. 22, 2005

(54) LIQUID-DISPENSING DEVICE

(76) Inventor: Jacob Lasry, 36 Weizmann Boulevard, 42251 Netanya (IL)

( * ) Notice: Subject to any disclaimer, the term of this patent is extended or adjusted under 35 U.S.C. 154(b) by 423 days.

(21) Appl. No.: 10/216,741

(22) Filed: Aug. 13, 2002

(65) Prior Publication Data

US 2004/0031821 A1 Feb. 19, 2004

(51) Int. Cl.[7] .............................................. B65D 83/00
(52) U.S. Cl. ..................... 222/400.8; 222/401
(58) Field of Search .......................... 222/382, 400.8, 222/401, 153.09, 380, 481.5

(56) References Cited

U.S. PATENT DOCUMENTS

| | | | | |
|---|---|---|---|---|
| 1,968,316 A | * | 7/1934 | Schmitt | 222/401 |
| 5,738,254 A | * | 4/1998 | de la Guardia | 222/400.8 |
| 5,957,330 A | | 9/1999 | Rempt | |
| 6,015,067 A | | 1/2000 | Lang | |
| 6,343,712 B1 | | 2/2002 | Flackett et al. | |
| 6,386,394 B1 | | 5/2002 | Vollrath et al. | |
| 6,394,319 B1 | | 5/2002 | Pucillo | |

* cited by examiner

Primary Examiner—Philippe Derakshani
(74) Attorney, Agent, or Firm—G.E. Ehrlich (1995) Ltd.

(57) ABSTRACT

A liquid-dispensing device is provided, which is simple in structure, has minimal space requirements, is operative with of a wide range of liquid consistencies, and is adapted for repeatedly dispensing a predetermined liquid volume from a liquid container. The device is particularly useful when contact between the liquid and the atmosphere is to be minimized, for example, when the liquid is a carbonated or naturally effervescent drink, fresh juice, or wines. Similarly, the device is useful when contact between the liquid and a user is to be avoided, for example, when the liquid is harsh or poisonous. The device is formed of common and easily available materials; it is inexpensive to produce and simple to operate. It is adapted for use with existing liquid containers, such as bottles, jerricans, beer kegs, or barrels, and makes pouring an easy task for anyone, and in particular, for children, the elderly, and people with disabilities.

30 Claims, 13 Drawing Sheets

LIQUID-DISPENSING DEVICE

FIELD OF THE INVENTION

The present invention relates generally to liquid-dispensing devices, and in particular, to resilient liquid-dispensing devices, adapted for dispensing a predetermined liquid volume.

BACKGROUND OF THE INVENTION

Liquid-dispensing devices are known. U.S. Pat. No. 6,015,067, to Lang, et al., entitled, "Bottle Top Dispenser," whose disclosure is incorporated herein by reference, describes a dispenser, adapted for repeatedly dispensing an adjustable liquid volume from a bottle.

However, the dispenser of U.S. Pat. No. 6,015,067 is rather complex. It has a valve housing and a piston-cylinder unit, adapted to be releasably affixed to the housing. The piston and cylinder can be activated in an axial stroke movement relative to one another, in order to draw liquid from a bottle on which the dispenser is set, and eject it. The intake process takes place in a spring-activated extension movement, and the ejection process takes place in a manually activated compression movement of the piston-cylinder unit. The dispenser has an activation unit, where a releasable activation connection can be produced between the former and the piston-cylinder unit. The activation unit is provided with the spring element for the intake process, and preferably designed for the manual action for ejection. The activation unit can be releasably affixed to the valve housing of the dispenser. Replacement of a piston-cylinder unit takes place as follows: First, the activation connection between the activation unit and the old piston-cylinder unit is released. The activation unit is taken off the valve housing, making the old piston-cylinder unit accessible. The old piston-cylinder unit is taken off the valve housing and the new piston-cylinder unit is affixed to it. Then a suitable activation unit is affixed to the valve housing, and finally, the activation connection between the activation unit and the new piston-cylinder unit is produced. The activation unit has sleeves which surround one another coaxially and are guided in telescope manner on one another, over the maximum stroke of the piston-cylinder unit. The spring element for intake is clamped between the sleeves. Preferably, a helical pressure spring is involved. The activation unit fits over the piston-cylinder unit affixed on the valve housing, in a coaxial arrangement. The releasable activation connection between the activation unit and the piston-cylinder unit can preferably be produced in the maximum compression position of the units. The latter is a locked rest position of the dispenser, which has a low height and is advantageous, for example, for storage in a refrigerator.

Similarly, U.S. Pat. No. 5,957,330, to Rempt, entitled, "Bottle Top Dispenser," whose disclosure is incorporated herein by reference, describes a bottle top dispenser, having a piston-cylinder unit, the piston and cylinder of which can be activated in an axial stroke movement relative to one another, in order to draw liquid from a bottle on which the dispenser is set, and dispense it. The maximum axial elongation of the piston and cylinder relative to one another is adjusted with a limiter. The dispenser has a volume display proportional to the limiter setting. The dispenser can be adjusted, by setting it, in a condition where the limiter and the volume display are independent of one another, in order to bring the displayed volume and the volume actually dispensed into agreement.

Again, the dispenser of U.S. Pat. No. 5,957,330 is rather complex. Additionally, it requires considerably space over the bottle.

U.S. Pat. No. 6,386,394, to Vollrath, et al., entitled, "Liquid-dispensing devices to Dispense a Predefined Amount of Liquid," whose disclosure is incorporated herein by reference, describes a liquid-dispensing device, comprising a container for supporting liquid, and a dispensing end with an opening. An internal reservoir of a predetermined volume, for holding the predefined amount of liquid, is located in the container and is connected to the opening. Additionally, an internal structure is provided for channeling liquid into the reservoir. Liquid is propelled from the reservoir by squeezing resiliently depressable portions of the container.

However, the dispenser of U.S. Pat. No. 6,386,394 is operable only with a compatible container, which has to be resilient, or have resilient portions, and which can be easily tipped over in order to fill the reservoir. Additionally, the container must include the internal reservoir and the internal structure for channeling liquid into the reservoir.

Additionally, U.S. Pat. No. 6,394,319, to Pucillo, entitled, "Flexible Liquid Feeding Assembly," whose disclosure is incorporated herein by reference, describes a flexible liquid feeding assembly as an add-on device for use with liquid dispensing bottles. The flexible liquid feeding assembly contains a flexible tube and a weight feeder for feeding liquid into a liquid-dispensing device of a liquid dispensing bottle. The flexible tube has a high degree of flexibility, and the weight feeder has a sufficient weight. Such structural features enable the weight feeder to move in the same direction of liquid's movement in the dispensing bottle. Therefore, the flexible liquid feeding assembly provides a continuous liquid supply regardless the bottle's orientations, even when the bottle is in an inverted position. Alternatively, a weight blocker can be used in conjunction with liquid feeding holes on the side of flexible tube. A liquid dispensing bottle containing a flexible liquid feeding assembly is also disclosed. The flexible tube is sufficiently long that the weight feeder or weight blocker can reach and be in contact with bottom and side walls of the container, and be in contact with a connector of the liquid-dispensing device when the bottle is inverted, so that the bottle enables to dispense liquid when the bottle is in an inverted position.

However, the dispenser of U.S. Pat. No. 6,394,319 is not adapted for dispensing a predetermined liquid volume from the bottle.

U.S. Pat. No. 6,343,712, to Flackett, et al., entitled, "Liquid-dispensing devices," whose disclosure is incorporated herein by reference, describes a liquid-dispensing device having a housing and containing a reservoir which is closed by a dispensing closure. The housing, which may be shaped like a rubber lizard, has suction cups, for example, on its paws, allowing the housing to be removeably stuck onto a vertical surface from which it can be pulled away when liquid is to be dispensed. Liquid, such as shampoo, cream rinse, or ketchup, may be dispensed by squeezing the housing, whereupon the closure opens to dispense liquid from the reservoir. After dispensing, the housing can be replaced at any position on the vertical surface merely by pressing the cups onto the surface.

However, the dispenser of U.S. Pat. No. 6,343,712 is operable only with a compatible container, arranged to fit within its housing.

There is thus a need for a liquid-dispensing device devoid of the above limitations.

SUMMARY OF THE INVENTION

According to one aspect of the present invention there is provided a liquid-dispensing device, adapted to fit onto a standard liquid container, the device comprising:

a body, which includes a resilient sac, defining an air reservoir of a predetermined volume, the resilient sac being designed to return to its nominal shape after compression;

a handle, adapted for compressing the air sac;

a cam system, in communication with the handle, for compressing a lower portion of the body somewhat before an upper portion, to ensure an upward flow of air in the air reservoir, under compression; and a dispensing construction, in mechanical communication with the handle, for sealing the liquid container when the handle is not being used, and for dispensing a predetermined volume of liquid, when the handle compresses the air sac.

According to an additional aspect of the present invention, the liquid container includes proximal and distal ends, with respect to the dispensing construciton, wherein the dispensing construction further includes:

a first air channel for allowing air from the air reservoir to enter the liquid container and apply pressure to a proximal surface of a liquid within the liquid container; and a liquid channel, in communication with the liquid at the distal end, for drawing liquid out of the distal end as the air applies pressure to the proximal surface of the liquid.

According to yet an additional aspect of the present invention, the device includes a valve for sealing the liquid channel when the liquid-dispensing device is not being used, thus minimizing the contact between the liquid and the atmosphere, and thus preventing gases of carbonated and naturally effervescent drinks from escaping from the liquid container.

According to still an additional aspect of the present invention, the liquid-channel valve is controlled by the handle.

According to yet an additional aspect of the present invention, the device includes a valve for sealing the air channel when the liquid-dispensing device is not being used.

According to still an additional aspect of the present invention, the air-channel valve is controlled by the handle.

According to yet an additional aspect of the present invention, the dispensing construction includes a standard, screw-threaded plug, for sealing the bottle.

According to yet an alternative aspect of the present invention, the dispensing construction includes a standard, press-fitted plug, for sealing the bottle.

According to yet an alternative aspect of the present invention, the dispensing construction further includes an inflatable plug, for sealing the bottle.

According to still an additional aspect of the present invention, the liquid container includes a second air channel, for allowing air from the air reservoir to expand the inflatable plug.

According to still an additional aspect of the present invention, the device includes a locking mechanism, when the device is not being used.

According to still an additional aspect of the present invention, the device is adapted for dispensing a liquid of a wide range of consistencies, selected from the group consisting of a carbonated drink, a naturally effervescent drink, a noncarbonated drink, mineral water, juice, beer, wine, vinegar, oil, liquid soap, shampoo, conditioner, cream rinse, a cleaning fluid, a laundry detergent, kerosene, gasoline, motor oil, and a chemical solution.

According to yet an additional aspect of the present invention, the liquid container is selected from the group consisting of a bottle of 1.5 liter, a bottle of 2.0 liters, a large mineral water bottle of between 15 and 30 liters, a barrel, a keg, and a jerrican.

According to another aspect of the present invention there is provided a liquid-dispensing system, comprising:

a liquid container; and a liquid-dispensing device, fitted onto the liquid container, the device including:

a body, which includes a resilient sac, defining an air reservoir of a predetermined volume, the resilient sac being designed to return to its nominal shape after compression;

a handle, adapted for compressing the air sac;

a cam system, in communication with the handle, for compressing a lower portion of the body somewhat before an upper portion, to ensure an upward flow of air in the air reservoir, under compression; and a dispensing construction, in mechanical communication with the handle, for sealing the liquid container when the handle is not being used, and for dispensing a predetermined volume of liquid, when the handle compresses the air sac.

According to still another aspect of the present invention there is provided a method of liquid dispensing, comprising:

providing a liquid-dispensing system, which includes:

a liquid container; and a liquid-dispensing device, fitted onto the liquid container, the device including:

a body, which includes a resilient sac, defining an air reservoir of a predetermined volume, the resilient sac being designed to return to its nominal shape after compression;

a handle, adapted for compressing the air sac;

a cam system, in communication with the handle, for compressing a lower portion of the body somewhat before an upper portion, to ensure an upward flow of air in the air reservoir, under compresssion; and a dispensing construction, in mechanical communication with the handle, for sealing the liquid container when the handle is not being used, and for dispensing a predetermined volume of liquid, when the handle compresses the air sac;

pressing the handle, thus activating the cam system, for compressing a lower portion of the body somewhat before an upper portion, to ensure an upward flow of air in the air reservoir, under compresssion;

simultaneously with the activating the cam system, compressing a spring, thus opening an air valve leading from the resilient sac, for allowing entry of air into the liquid container, by the pressure of the pressing;

simultaneously with the opening an air valve, opening a liquid channel, from an inner distal portion of the liquid container to a dispensing spout, for dispensing liquid, forced out by the entry of air.

The present invention successfully addresses the shortcomings of the presently known configurations by providing a liquid-dispensing device, which is simple in structure, has minimal space requirements, is operative with of a wide range of liquid consistencies, and is adapted for repeatedly dispensing a predetermined liquid volume from a liquid container. The device is particularly useful when contact between the liquid and the atmosphere is to be minimized, for example, when the liquid is a carbonated or naturally effervescent drink, fresh juice, or wines. Similarly, the device is useful when contact between the liquid and a user is to be avoided, for example, when the liquid is harsh or poisonous.

The device is formed of common and easily available materials; it is inexpensive to produce and simple to operate. It is adapted for use with existing liquid containers, such as bottles, jerricans, beer kegs, or barrels, and makes pouring an easy task for anyone, and in particular, for children, the elderly, and people with disabilities.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
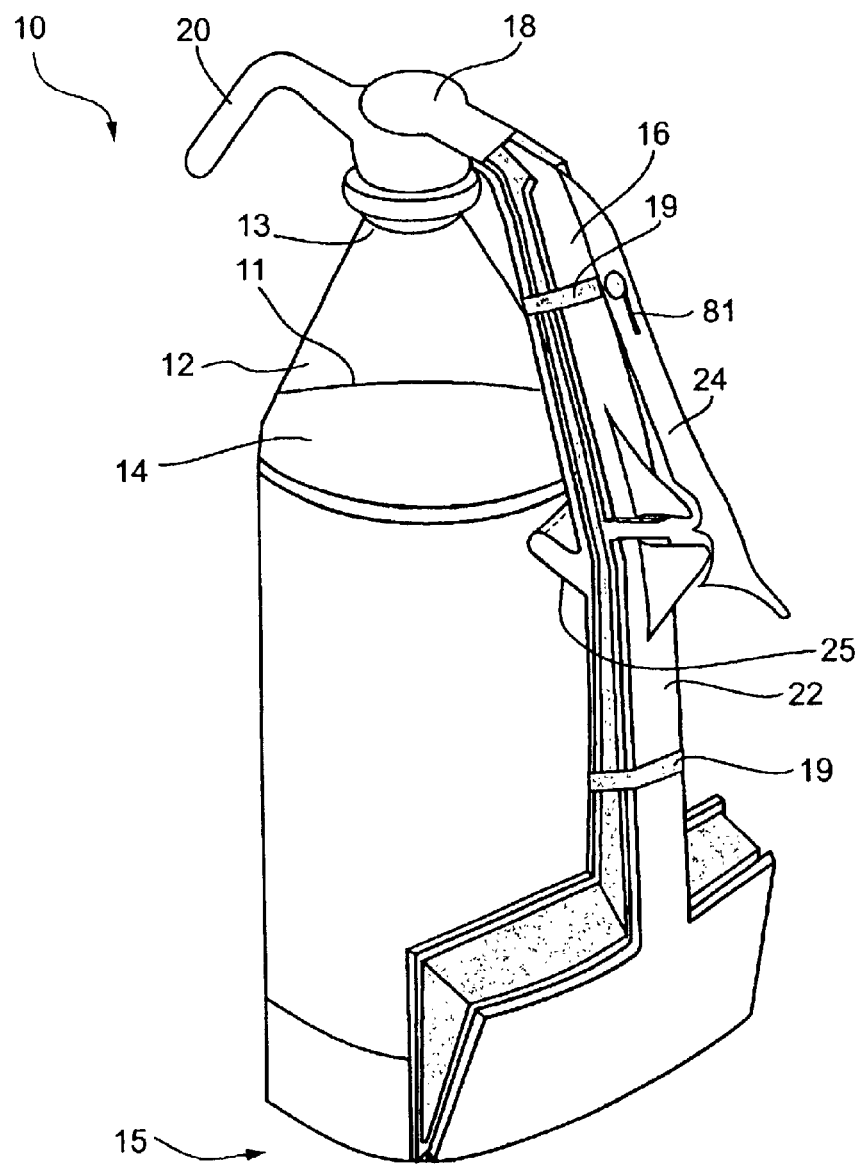
FIG. 1 schematically represents a bottle-and-dispenser system, in accordance with a preferred embodiment of the present invention.

The present invention is of a liquid-dispensing device, which is simple in structure, has minimal space requirements, is operative with of a wide range of liquid consistencies, and is adapted for repeatedly dispensing a predetermined liquid volume from a liquid container. The device is particularly useful when contact between the liquid and the atmosphere is to be minimized, for example, when the liquid is a carbonated or naturally effervescent drink, fresh juice, or wines. Similarly, the device is useful when contact between the liquid and a user is to be avoided, for example, when the liquid is harsh or poisonous.

The device is formed of common and easily available materials; it is inexpensive to produce and simple to operate. It is adapted for use with existing liquid containers, such as bottles, jerricans, beer kegs, or barrels, and makes pouring an easy task for anyone, and in particular, for children, the elderly, and people with disabilities.

The principles and operation of the liquid-dispensing device, according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 schematically represents a bottle-and-dispenser system 10, comprising a bottle 12 and a liquid-dispensing device 16, in accordance with a preferred embodiment of the present invention.

Bottle 12, which has an opening 13 and a distal end 15, is preferably a standard, store-bought bottle of a specific liquid 14. Liquid 14 has a proximal surface 11. In accordance with the present embodiment, bottle 12 may be about 1–2 liters in size and contains several liquid servings. It will be appreciated that other sizes are similarly possible.

Liquid 14 may be, for example, a carbonated or naturally effervescent drink, a noncarbonated drink, mineral water, juice, beer, wine, or the like. Alternatively, liquid 14 may be vinegar, oil, or the like. Alternatively, liquid 14 may be liquid soap, shampoo, conditioner, or the like. Alternatively, liquid 14 may be a cleaning fluid, a liquid laundry detergent, or the like. Alternatively, liquid 14 may be kerosene, gasoline or the like. Alternatively, liquid 14 may be a chemical solution.

It will be appreciated that a specific advantage of bottle-and-dispenser system 10 is that it enables the user (not shown) to dispense liquid 14, while avoiding contact with the skin, for example in cases of harsh, irritating, or poisonous liquids.

Liquid-dispensing device 16 comprises a dispensing construction 18, arranged to fit over opening 13, and a spout 20, through which liquid 14 is dispensed from bottle 12.

Additionally, liquid-dispensing device 16 comprises a body 22, operative as a resilient air pump, and a handle 24, which is preferably ergonomically designed. Body 22 is attached to bottle 12 by dispensing construction 18, fitting over opening 13. An arm 25 of body 22 rests against bottle 12. A locking mechanism 81 is operative to lock and unlock liquid-dispensing device 16, as will be described hereinbelow, in conjunction with FIG. 6. At least one, and preferably two rigid strips 19 provide structural support.

Figure 2:
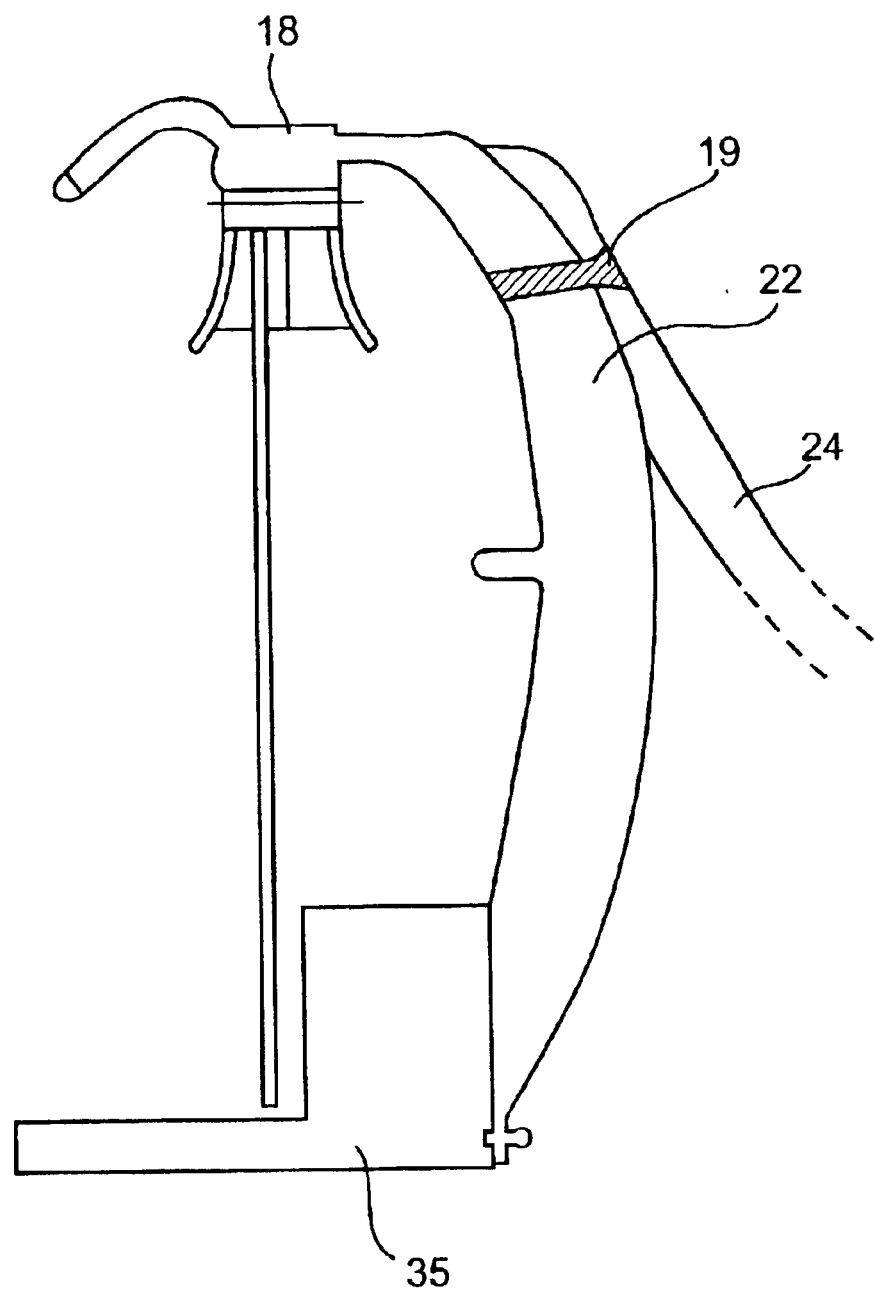
FIG. 2 schematically represents a base for the bottle-and-dispenser system of FIG. 1.

Referring further to the drawings, FIG. 2 schematically represents a hollow base 35, on which bottle 12 (FIG. 1) may be fitted.

Figure 3A:
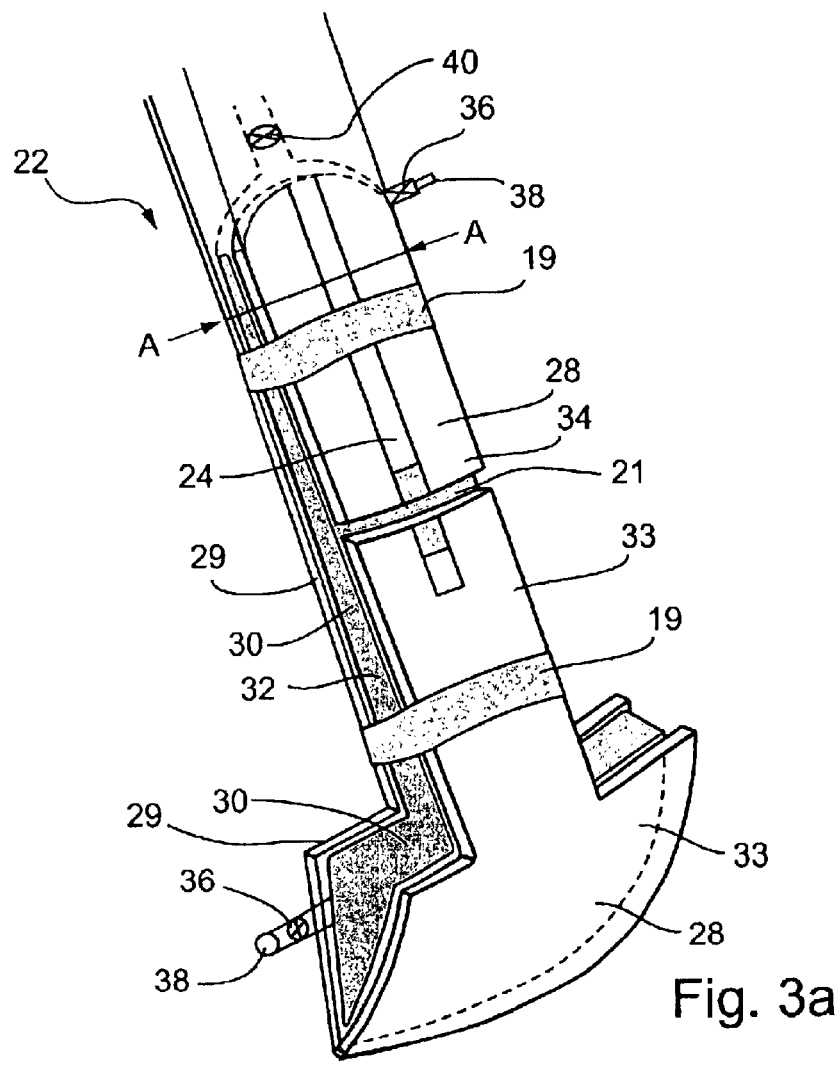
FIGS. 3A–3C schematically represent a pictorial view and a cross-sectional view of a liquid dispensing device, in accordance with a preferred embodiment of the present invention.
Figure 3B:
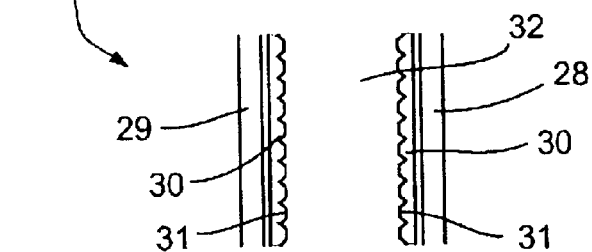
Figure 3C:
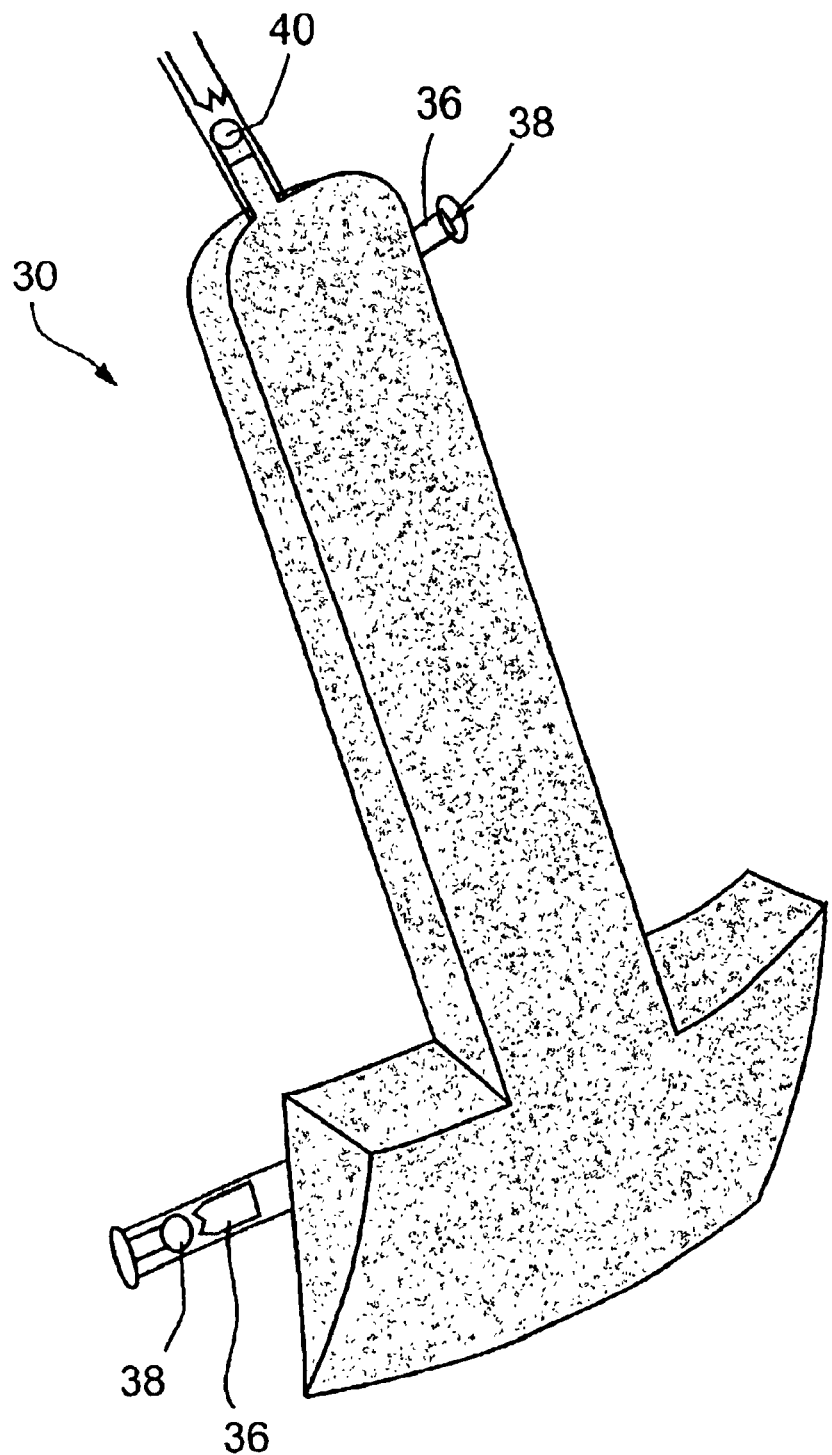

Referring further to the drawings, FIGS. 3A–3C schematically represent body 22, in accordance with a preferred embodiment of the present invention.

As seen in FIG. 3A, body 22 is formed of a rigid front panel 28, a rigid back panel 29, and a resilient sac 30, sandwitched between them. In accordance with a preferred embodiment of the present invention, resilient sac 30 may be glued to panels 28 and 29. Additionally, rigid housing 19 provides structural support.

Rigid panels 28 and 29 may be formed, for example, of a rigid plastic, Formica, and the like. Resilient sac 30 is formed of a biologically inert and biologicaly compatible resilient material, for example, natural or synthetic rubber, or the like. Resilient sac 30 defines an air reservoir 32, preferably of about 300 cc. It will be appreciated that other volumes, for example, 500 cc or 250 cc may be used. The size of air reservoir 32 predetermines the liquid volume to be dispensed.

Additionally, body 22 defines a lower portion 33 and an upper portion 34. A cutout section 21 in rigid front panel 28, separates upper portion 34 from lower portion 33, mechanically, so that portions 33 and 34 may be somewhat independent of each other.

Furthermore, body 22 includes at least one, and possibly two or more oneway air inlet valves 36, for allowing airflow into body 22. Upstream of each air inlet valve 36, an air filter 38 may be provided, to ensure that no foreign particles enter the bottle. At least one of one-way air inlet valves 36 is located at lower portion 33. Additionally, body 22 includes a one-way air outlet valve 40, in communication with bottle 12 (FIG. 1), for allowing airflow from body 22 into bottle 12.

FIG. 3B illustrates a portion of a cross-sectional view of body 22, showing rigid panels 28 and 29, and resilient sac 30. Resilient sac 30 has a rough internal surface 31, to prevent its inner surfaces from sticking to each other, when sac 30 is compressed.

FIG. 3C illustrates resilient sac 30, without rigid panels 28 and 29.

Figure 4A:
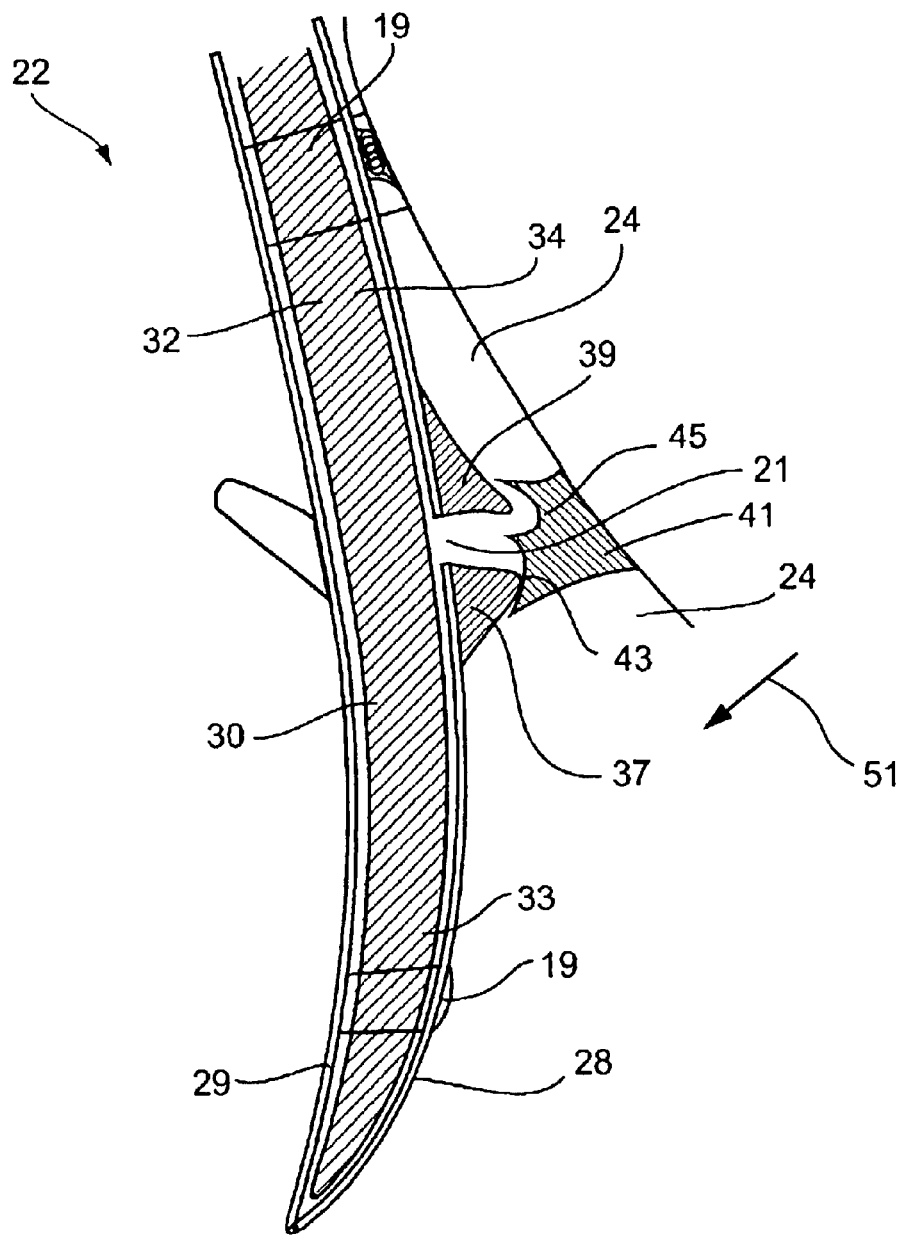
FIGS. 4A and 4B schematically represent the operation of a liquid dispensing device, in accordance with a preferred embodiment of the present invention.
Figure 4B:
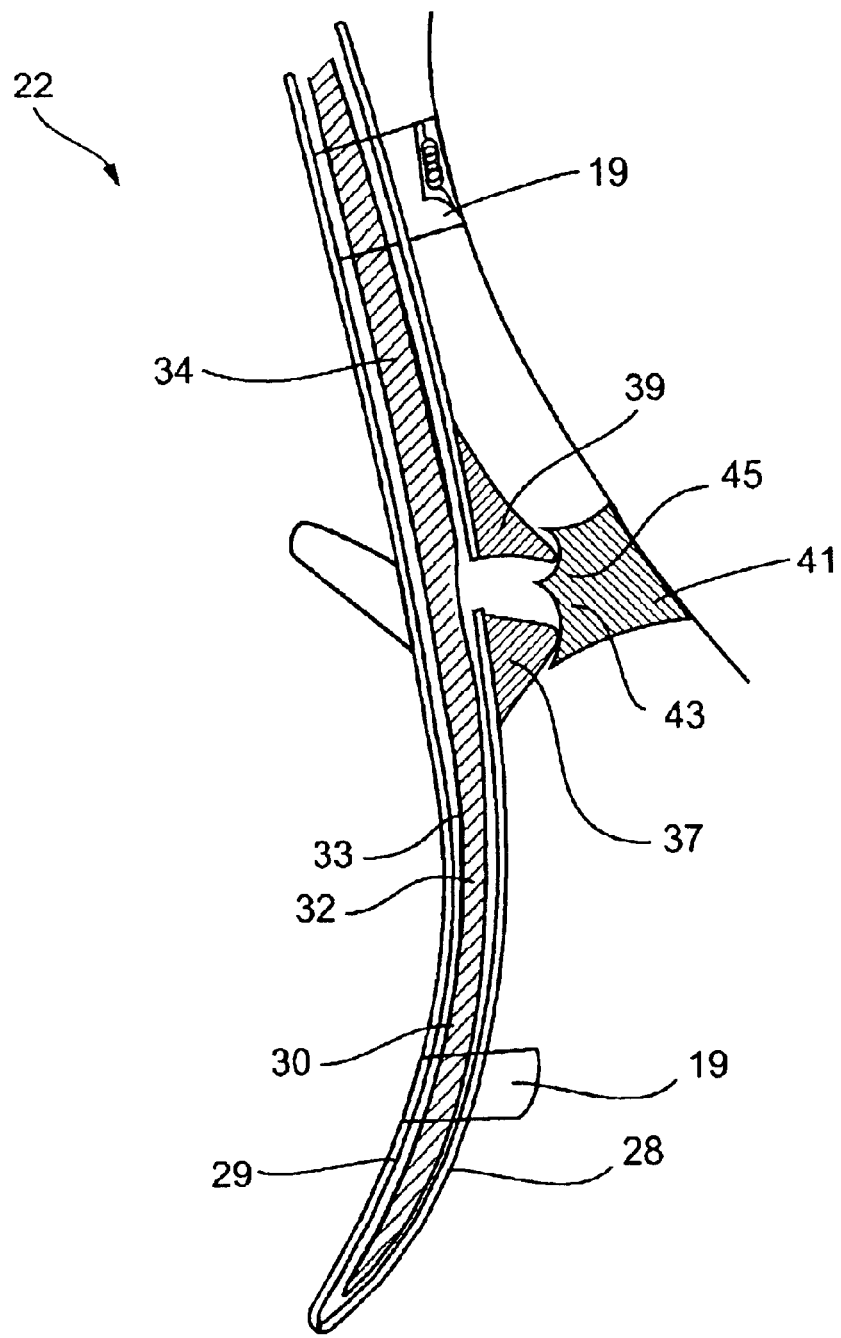

Referring further to the drawings, FIGS. 4A and 4B schematically represent handle 24 as it presses on body 22, in accordance with a preferred embodiment of the present invention.

Handle 24 is operative to press on body 22, so as to push the air volume out of reservoir 32 and into bottle 12 (FIG. 1) thus causing the dispensing of liquid 14. In order for upper portion 34 not to close, and block airflow from lower portion 33, handle 24 begins by compressing lower portion 33 first, as follows:

Body 22 includes a first cam 37, operative to press on lower portion 33 and a second cam 39, operative to press on upper portion 34. Additionally, handle 24 includes a cam 41 having a first curvature 43, in communication with first cam 37 of lower portion 33 and a second curvature 45, in communication with second cam 39, of upper portion 34. Cutout section 21 in rigid front panel 28, separates upper portion 34 from lower portion 33, mechanically.

First and second cams 37 and 39 and first and second curvatures 43 and 45 are designed so that as handle 24 is pressed down in the direction of arrow 51, cam 41 engages with first cam 37, which presses against lower portion 33, until lower portion 33 is partially empty. Cam 41 then engages with second cam 39, which presses against upper portion 34.

Figure 5A:
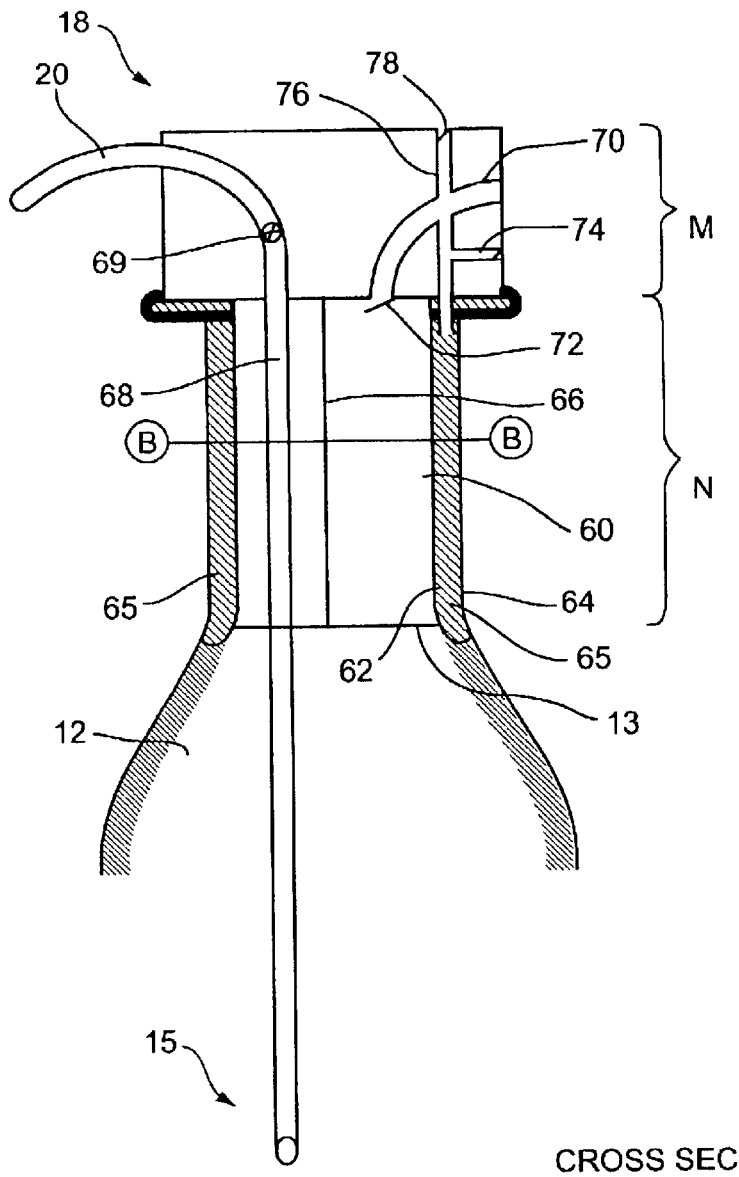
FIGS. 5A and 5B schematically represent a dispensing construction, in accordance with a preferred embodiment of the present invention.
Figure 5B:
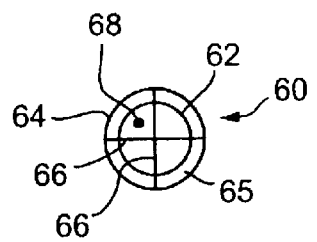

Referring further to the drawings, FIGS. 5A and 5B schematically represent dispensing construction 18, in accordance with a preferred embodiment of the present invention. Title: Liquid-Dispensing Device As seen in FIG. 5A, dispensing construction 18 includes a plug 60, adapted for sealing opening 13 of bottle 12. Plug 60 is formed of a solid portion M and a hollow portion N. Solid portion M may be formed, for example, of natural or synthetic rubber.

As seen in FIG. 5B, which is cross-sectional view B—B of FIG. 5A, hollow portion N includes a rigid inner shell 62 and an inflatable, flexible outer shell 64. Rigid inner shell 62 and inflatable outer shell 64 define an inflatable volume 65 within, of about 20 cc. It will be appreciated that other values for inflatable volume 65 are also possible. The purpose of inflatable outer shell 64 and inflatable volume 65 is to expand and fit tightly within any bottle opening 13, and form a seal.

Inflation of inflatable volume 65 may be achieved by lightly pressing resilient sac 30 (FIGS. 3A and 3C), with the fingers, until a seal is formed between plug 60 and bottle 12.

Additionally, plug 60 includes at least one and preferably more than one rigid panels 66, for structural support. Preferably, plug 60 is of a size that will fit most standard bottles.

In accordance with an alternative embodiment, plug 60 may be formed of a solid material, for example cork, natural or synthetic rubber, plastic or the like. Plug 60 may have a standard bottle opening size, such as a standard, 1.5-liter, coke bottle-opening size, or another standard size. Thus the inflatable outer shell need not be used. Plug 60 may have a screw thread, or may be press-fitted.

Dispensing construction 18 further includes a channel 68, leading from distal end of 15 of bottle 12 to spout 20, for dispensing liquid 14. Channel 68 includes a valve 69, to prevent a gas of a carbonated or naturally effervescent drink from escaping, and to minimize contact between liquid 14 and the atmosphere. Additionally, dispensing construction 18 includes an air channel 70 leading from resilient sac 30 (FIGS. 3A–3C) via one-way air outlet valve 40 to bottle 12, for providing the air pressure that causes the dispension of liquid 14. Air channel 70 may further include a one-way valve 72, for example, arranged as a tongue 72, that opens when air flows into bottle 12. Furthermore, dispensing construction 18 includes an air channel 74 leading from resilient sac 30 via one-way air outlet valve 40 to inflatable volume 65 of plug 60, for inflating inflatable volume 65, when plug 60 is mounted on bottle 12. Moreover, dispensing construction 18 includes an air channel 76, leading from inflatable volume 65 out, to enable the deflation of inflatable volume 65 and the removal of plug 60 from bottle 12, when desired. A manual one-way outlet valve 78 controls the deflation of inflatable volume 65 of plug 60. It will be appreciated that valves 36 and 40 (FIG. 3A) and valves 72 and 78 (FIG. 5A) are one-way air valves, as known. Valve 69 is a liquid and air valve, as known.

Figure 6:
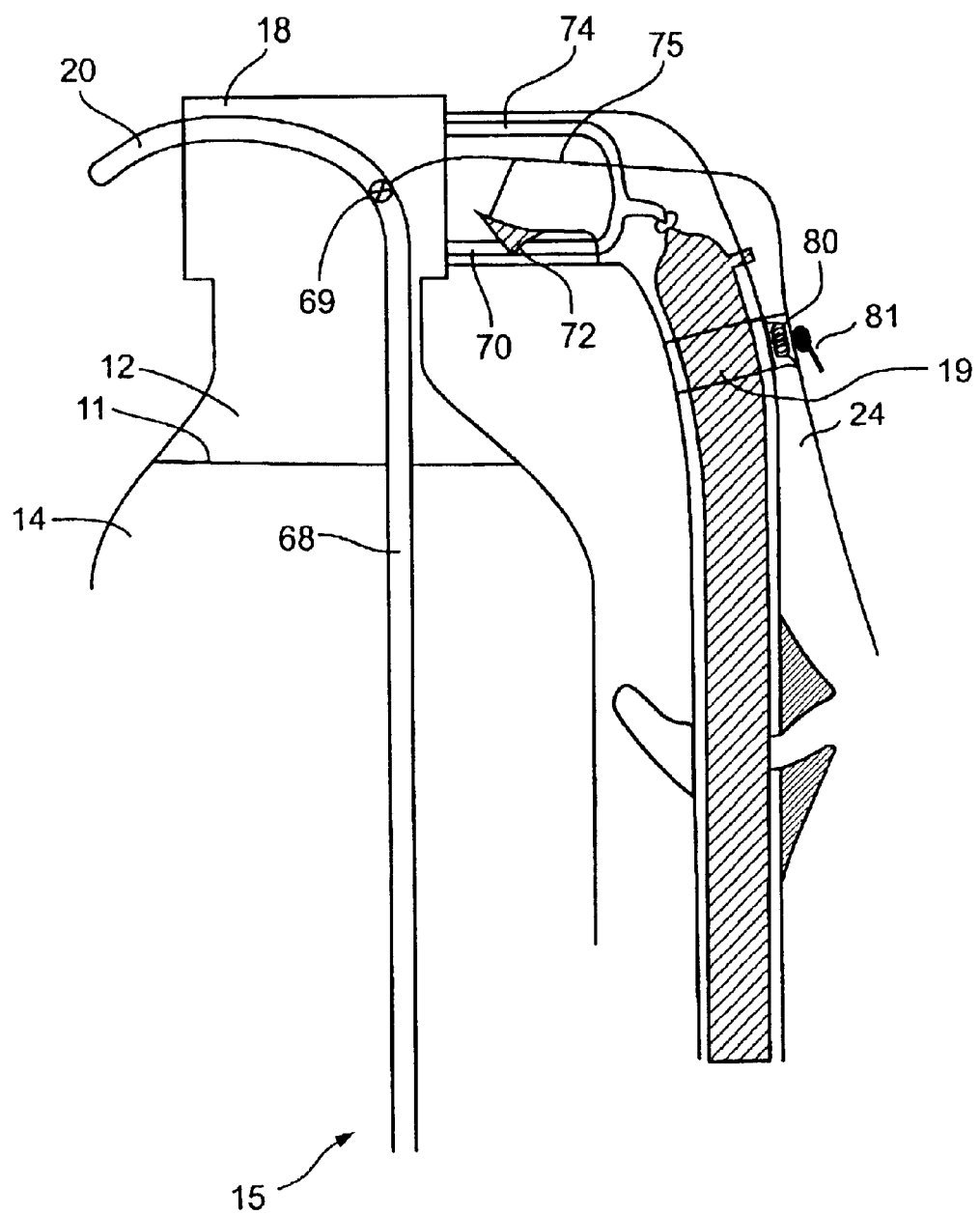
FIG. 6 schematically represents the process of dispensing liquid, in accordance with a preferred embodiment of the present invention.

Referring further to the drawings, FIG. 6 schematically represents the process of dispensing liquid 14 from bottle 12, in accordance with a preferred embodiment of the present invention. Dispension of liquid 14 occurs as a result of interactions between handle 24, a spring 80, and valves 72 and 69. Locking mechanism 81, which locks spring 80 in an inoperative mode, for example, by preventing spring 80 from compressing, prevents accidental spilling. Alternatively, or additionally, locking mechanism 81 may lock handle 24, valve 72, or valve 69, to prevent accidental spilling.

In accordance with the preferred embodiment of the present invention, the operation of dispensing construction 18 is as follows:

1. When first mounting dispensing construction 18 onto bottle 12, the user ensures that a seal is formed between plug 60 and opening 13. Preferably, the seal is formed by manually pressing on resilient sac 30, to inflate inflatable volume 65. The user then arranges locking mechanism 81 in a locking position to prevent accidental spilling.
2. Prior to operation, the user sets locking mechanism 81 to an operative mode.
3. For dispensing liquid 14, the user presses handle 24, thus compressing spring 80. A wire 75 provides communication between spring 80 and valve 72 of air channel 70, which leads from resilient sac 30 to bottle 12. Additionally, wire 75 provides communication between spring 80 and valve 69 of channel 68, which leads from distal end 15 of bottle 12 to spout 20. Thus, compressing spring 80 causes both valves to open. As air, flowing out of channel 70, presses down on proximal surface 11 of liquid 14, liquid 14 flows from distal end 15 of bottle 12, via channel 68, and out of spout 20.
4. After dispensing, the user releases handle 24. As handle 24 is released, it releases the compression on spring 80. Spring 80 returns to its nominal. state, valves 69 and 72 close, and the flow of liquid through spout 20 stops.

Figure 7:
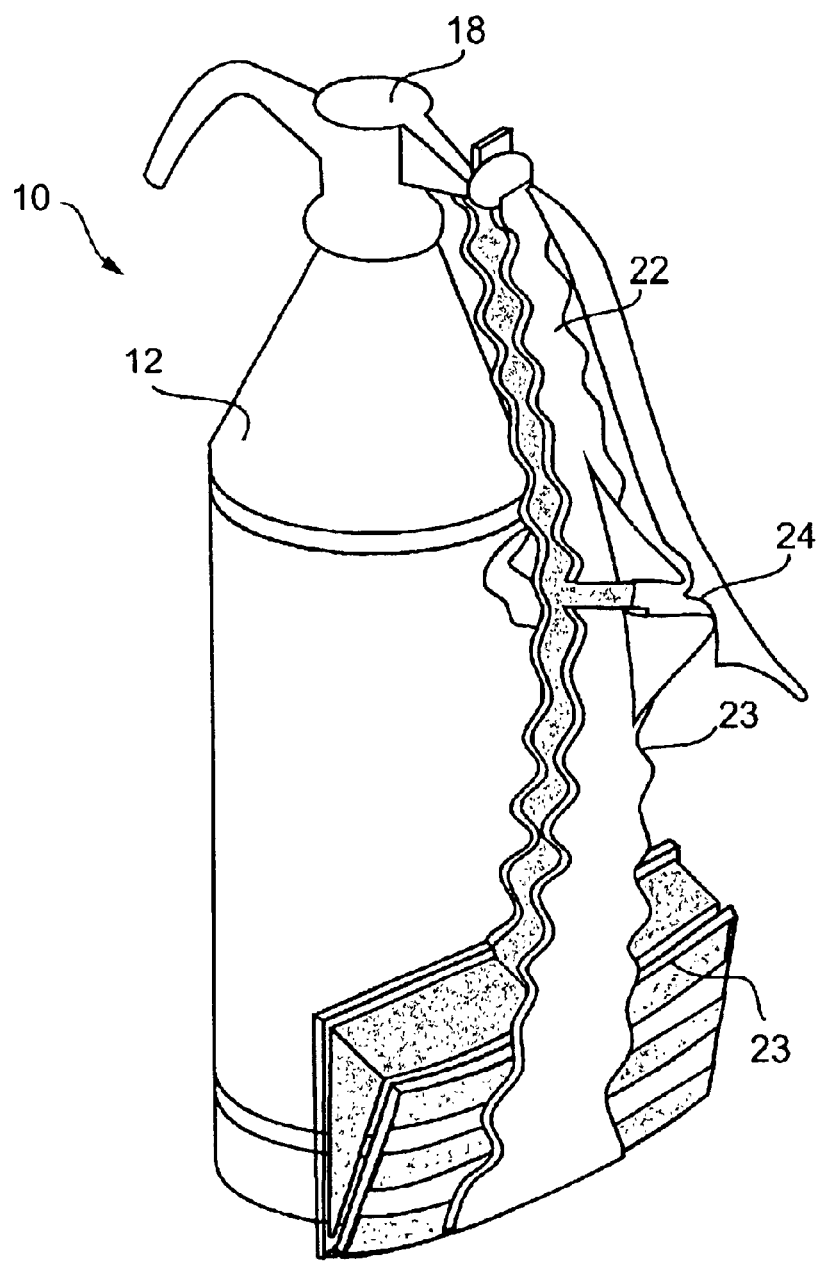
FIG. 7 schematically represents a bottle-and-dispenser system, comprising a decorative body, in accordance with preferred embodiments of the present invention.
Figure 8:
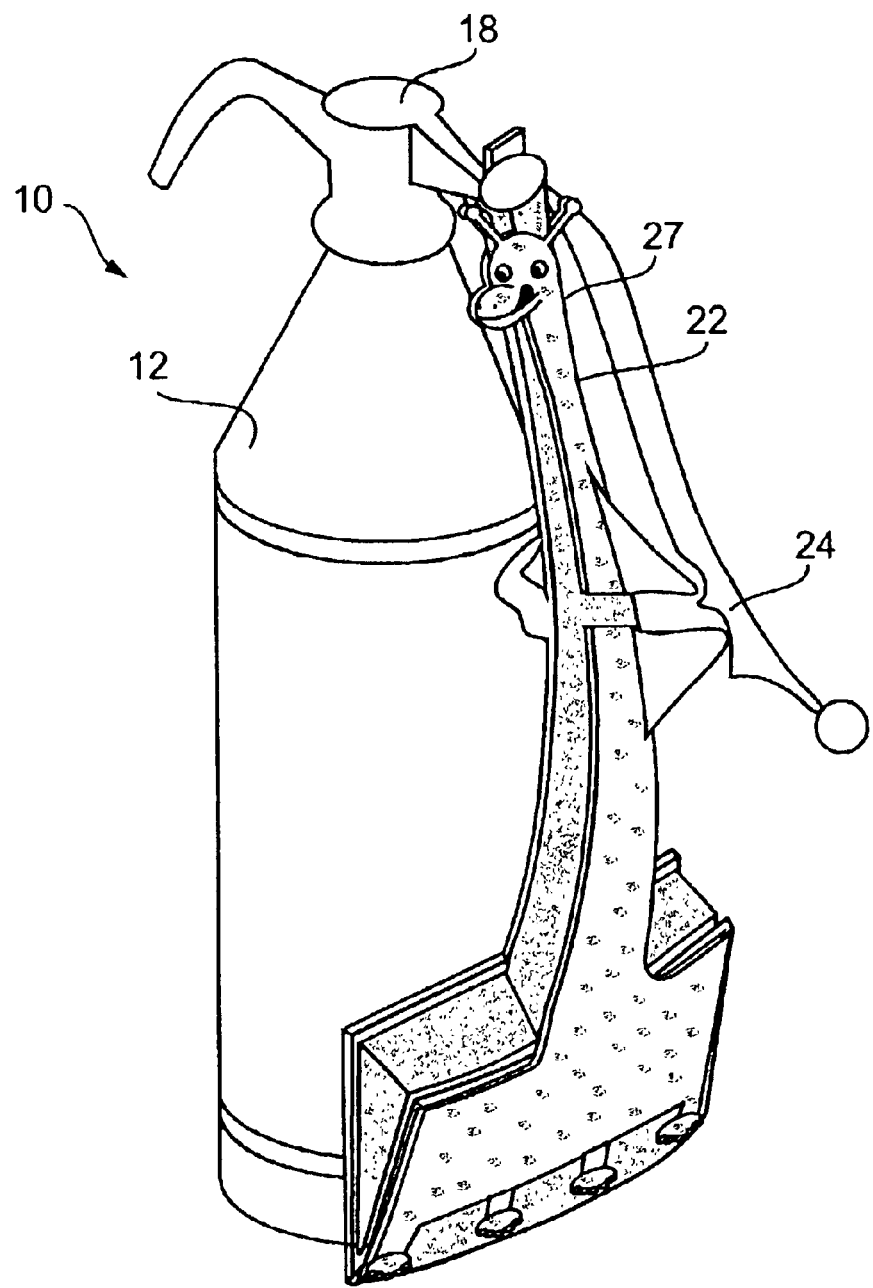
FIG. 8 schematically represents a bottle-and-dispenser system, comprising a giraffe, in accordance with preferred embodiments of the present invention.
Figure 9:
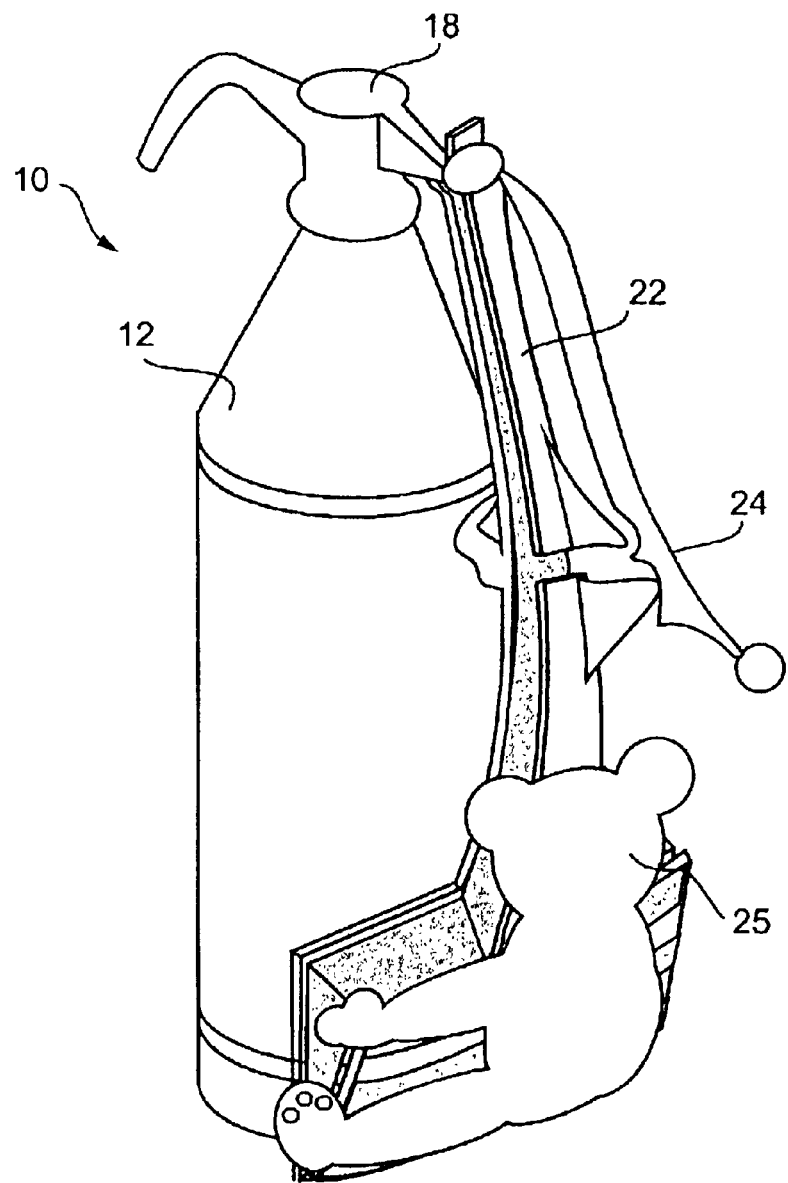
FIG. 9 schematically represents a bottle-and-dispenser system, comprising a teddy bear, in accordance with preferred embodiments of the present invention.

Referring further to the drawings, FIGS. 7–9 schematically represent bottle-and-dispenser systems 10, comprising decorative bodies 22 in accordance with preferred embodiments of the present invention. FIG. 7 illustrates body 22 comprising decorative patterns 23, FIG. 8 illustrates body 22 comprising a giraffe 27 and FIG. 9 illustrates body 22 comprising a teddy bear 25.

It will be appreciated that other decorative patterns and designs are possible and are within the scope of the present invention.

Figure 10:
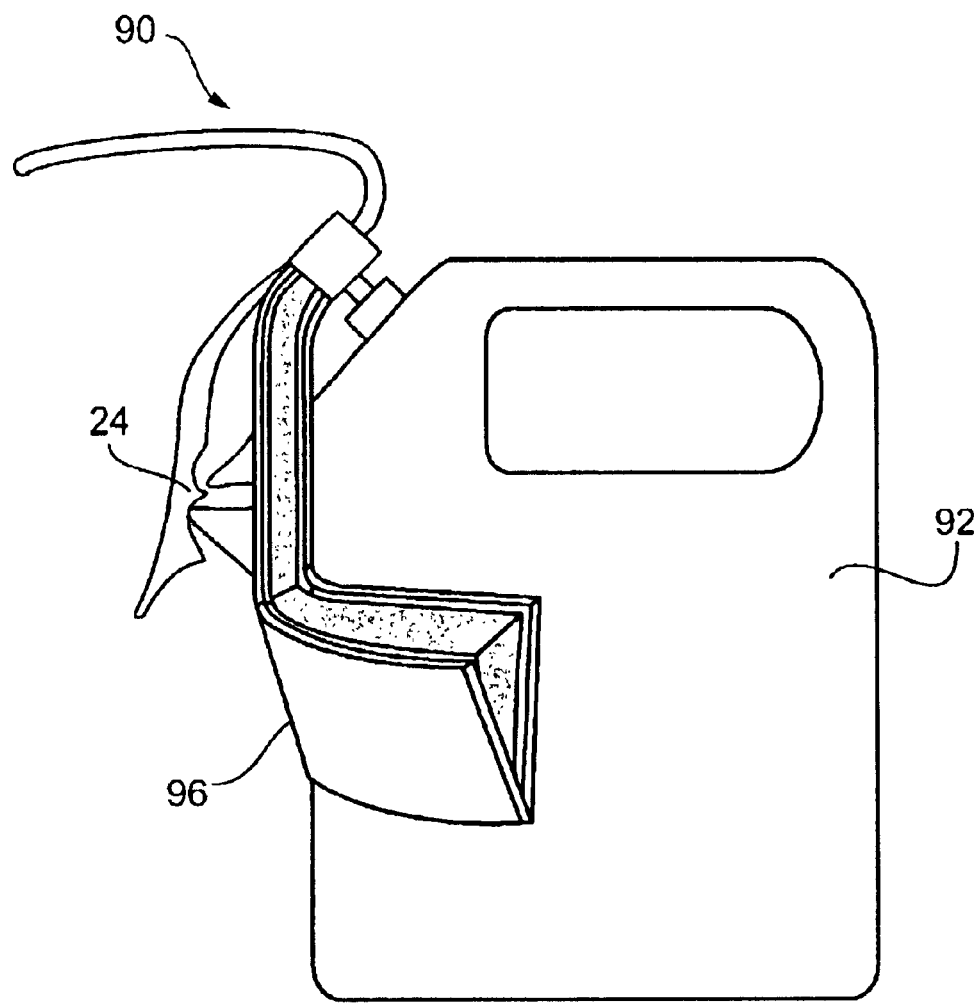
FIG. 10 schematically represents a dispenser system, adapted for a jerrican.
Figure 11:
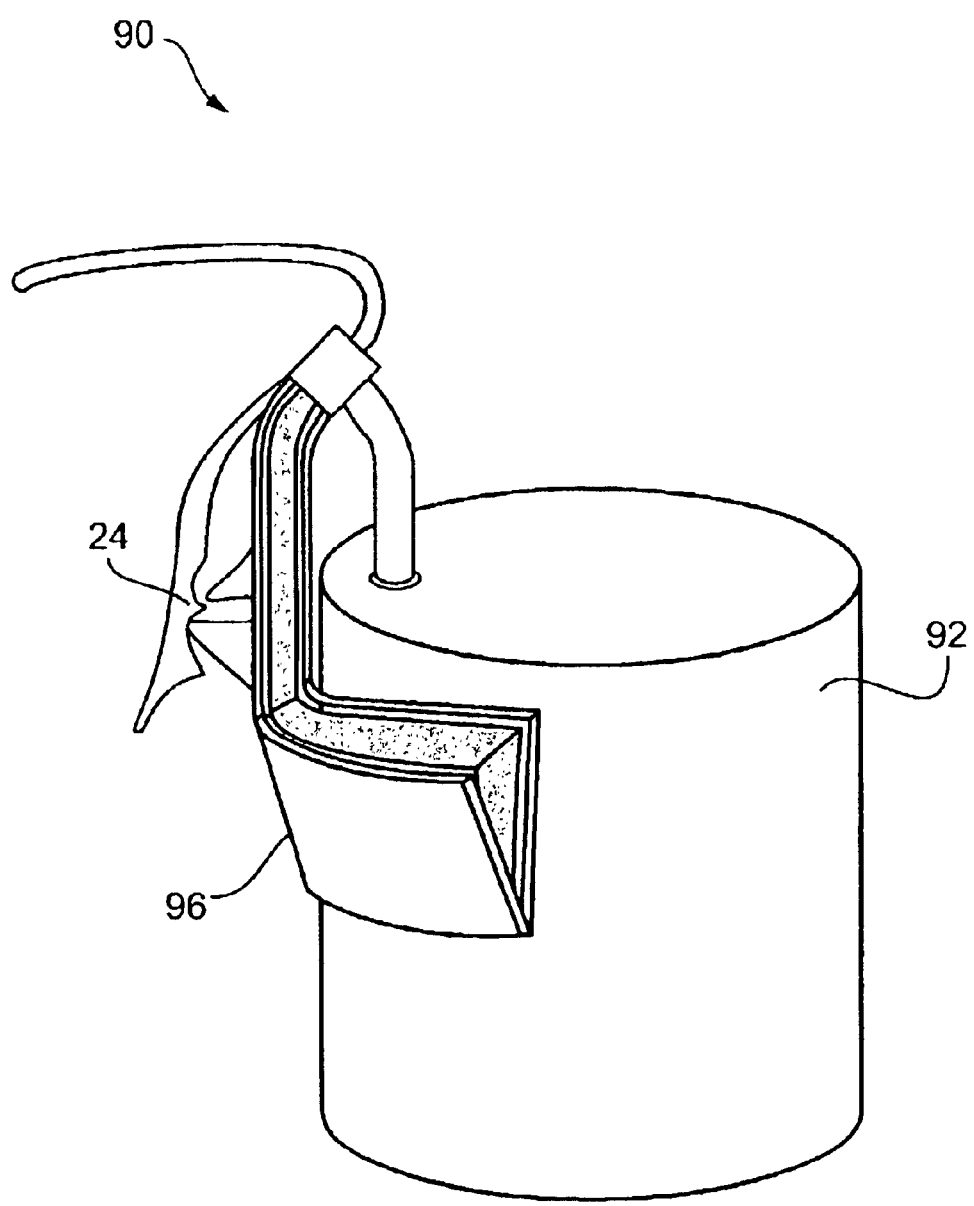
FIG. 11 schematically represents a dispenser system, adapted for a barrel.

Referring further to the drawings, FIGS. 10–11 schematically represent dispenser systems 90, comprising liquid-dispensing devices 96, adapted for large containers 92. Large container 92 may be, for example, a large mineral water bottle, for example of 18, 25, or 32 litters. The advantage of using liquid-dispensing device 96 with a large mineral water bottle is that the bottle need not be lifted and overturned, as required by known mineral-water dispensing systems for large bottles.

Alternatively, large container 92 may be a water jerrican, and liquid-dispensing device 96 may be used for dispensing water in field conditions.

Alternatively, large container 92 may be a beer keg, and liquid-dispensing device 96 may be used for serving beer on tap.

Alternatively, large container 92 may be an oil barrel, such as may be used by auto mechanics, who need to pour a predetermined amount of oil for an oil change.

It will be appreciated that other forms and uses of large containers are possible, for various liquids, and are within the scope of the present invention.

The present invention is of a simple liquid-dispensing device, for predetermined liquid volumes. The device is formed of common and easily available materials; it is inexpensive to produce and simple to operate. Additionally, the device is adapted for use with existing liquid containers, such as bottles of 1.5 liters, bottles of 2.0 liters, jerricans, beer kegs, barrels, or other standard liquid containers.

The device makes pouring an easy task for children, the elderly, people with disabilities, and anyone else.

When adapted for drinks, the device may be designed to dispense a predetermined liquid volume of 300 cc. Yet, as has been taught, smaller or greater volumes may be dispensed. When adapted for other uses, the device may be designed to dispense a predetermined liquid volume as needed. For example, when dispensing motor oil, the device may be designed to dispense oil in volumes of 0.5 liters, or 1 litter.

The liquid-dispensing device of the present invention, operative by air compression, does not require pumping like most dispensing devices, and a single hand motion will deliver the predetermined volume of liquid.

It is important to note that the liquid-dispensing device of the present invention has little effect on the liquid, as it prevents the liquid from coming in contact with the atmosphere, and prevents gases in the liquid from escaping.

The device is particularly useful when contact between the liquid and the atmosphere is to be minimized, for example, when the liquid is a carbonated or naturally effervescent drink, fresh juice, or wines.

Similarly, the device is useful when contact between the liquid and a user is to be avoided, for example, when the liquid is harsh or poisonous.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that tall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A liquid-dispensing device, adapted to fit onto a liquid container, said device comprising:
    a body, which includes a resilient sac, defining an air reservoir of a predetermined volume, said resilient sac being designed to return to its nominal shape after compression;
    a handle, adapted for compressing said air sac;
    a cam system, in communication with said handle, for compressing a lower portion of said body somewhat before an upper portion, to ensure an upward flow of air in said air reservoir, under compresssion; and
    a dispensing construction, in mechanical communication with said handle, for sealing said liquid container when said handle is not being used, and for dispensing a predetermined volume of liquid, when said handle compresses said air sac.

2. The liquid-dispensing device of claim 1, wherein said liquid container includes proximal and distal ends, with respect to said dispensing construciton, and wherein said dispensing construction further includes:
    a first air channel for allowing air from said air reservoir to enter said liquid container and apply pressure to a proximal surface of a liquid within said liquid container; and a liquid channel, in communication with said liquid at said distal end, for drawing liquid out of said distal end as said air applies pressure to said proximal surface.

3. The liquid-dispensing device of claim 2, and further including a valve for sealing said liquid channel when said liquid-dispensing device is not being used, thus minimizing contact between said liquid and the atmosphere, and thus preventing gases of carbonated and naturally effervescent drinks from escaping from said liquid container.

4. The liquid-dispensing device of claim 3, wherein said liquid-channel valve is controlled by said handle.

5. The liquid-dispensing device of claim 2, and further including a valve for sealing said air channel when said liquid-dispensing device is not being used.

6. The liquid-dispensing device of claim 5, wherein said air-channel valve is controlled by said handle.

7. The liquid-dispensing device of claim 1, wherein said dispensing construction further includes a standard screw-threaded plug, for sealing said liquid container.

8. The liquid-dispensing device of claim 1, wherein said dispensing construction further includes a standard, press-fitted plug, for sealing said liquid container.

9. The liquid-dispensing device of claim 1, wherein said dispensing construction further includes an inflatable plug, for sealing said liquid container.

10. The liquid-dispensing device of claim 9, wherein said liquid container includes a second air channel, for allowing air from said air reservoir to expand said expensible plug.

11. The liquid-dispensing device of claim 1, wherein said device further includes a locking mechanism, when said device is not being used.

12. The liquid-dispensing device of claim 1, adapted for dispensing a liquid selected from the group consisting of a carbonated drink, a naturally effervescent drink, a noncarbonated drink, mineral water, juice, beer, wine, vinegar, oil, liquid soap, shampoo, conditioner, cream rinse, a cleaning fluid, a laundry detergent, kerosene, gasoline, motor oil, and a chemical solution.

13. The liquid-dispensing device of claim 1, wherein said liquid container is selected from the group consisting of a bottle of 1.5 liter, a bottle of 2.0 liters, a large mineral water bottle of between 15 and 30 liters, a barrel, a keg, and a jerrican.

14. The liquid-dispensing device of claim 1, wherein said liquid container is a standard container.

15. A liquid-dispensing system, comprising:
   a liquid container; and
   a liquid-dispensing device, fitted onto said liquid container, said device including:
      a body, which includes a resilient sac, defining an air reservoir of a predetermined volume, said resilient sac being designed to return to its nominal shape after compression;
      a handle, adapted for compressing said air sac;
      a cam system, in communication with said handle, for compressing a lower portion of said body somewhat before an upper portion, to ensure an upward flow of air in said air reservoir, under compresssion; and
      a dispensing construction, in mechanical communication with said handle, for sealing said liquid container when said handle is not being used, and for dispensing a predetermined volume of liquid, when said handle compresses said air sac.

16. The liquid-dispensing system of claim 15, wherein said liquid container includes proximal and distal ends, with respect to said dispensing construciton, and wherein said dispensing construction further includes:
   a first air channel for allowing air from said air reservoir to enter said liquid container and apply pressure to a proximal surface of a liquid within said liquid container; and
   a liquid channel, in communication with said liquid at said distal end, for drawing liquid out of said distal end as said air applies pressure to said proximal surface.

17. The liquid-dispensing system of claim 16, and further including a valve for sealing said liquid channel when said liquid-dispensing device is not being used, thus minimizing contact between said liquid and the atmosphere, and thus preventing gases of carbonated and naturally effervescent drinks from escaping from said liquid container.

18. The liquid-dispensing system of claim 17, wherein said liquid-channel valve is controlled by said handle.

19. The liquid-dispensing system of claim 16, and further including a valve for sealing said air channel when said liquid-dispensing device is not being used.

20. The liquid-dispensing system of claim 19, wherein said air-channel valve is controlled by said handle.

21. The liquid-dispensing system of claim 15, wherein said dispensing construction further includes a standard screw-threaded plug, for sealing said liquid container.

22. The liquid-dispensing system of claim 15, wherein said dispensing construction further includes a standard, press-fitted plug, for sealing said liquid container.

23. The liquid-dispensing system of claim 15, wherein said dispensing construction further includes an inflatable plug, for sealing said liquid container.

24. The liquid-dispensing system of claim 23, wherein said liquid container includes a second air channel, for allowing air from said air reservoir to expand said expansible plug.

25. The liquid-dispensing system of claim 15, wherein said device further includes a locking mechanism, when said device is not being used.

26. The liquid-dispensing system of claim 15, adapted for dispensing a liquid selected from the group consisting of a carbonated drink, a naturally effervescent drink, a noncarbonated drink, mineral water, juice, beer, wine, vinegar, oil, liquid soap, shampoo, conditioner, cream rinse, a cleaning fluid, a laundry detergent, kerosene, gasoline, motor oil, and a chemical solution.

27. The liquid-dispensing system of claim 15, wherein said liquid container is selected from the group consisting of a bottle of 1.5 liter, a bottle of 2.0 liters, a large mineral water bottle of between 15 and 30 liters, a barrel, a keg, and a jerrican.

28. A method of liquid dispensing, comprising:
   providing a liquid-dispensing system, which includes:
      a liquid container; and
      a liquid-dispensing device, fitted onto said liquid container, said device including:
         a body, which includes a resilient sac, defining an air reservoir of a predetermined volume, said resilient sac being designed to return to its nominal shape after compression;
         a handle, adapted for compressing said air sac;
         a cam system, in communication with said handle, for compressing a lower portion of said body somewhat before an upper portion, to ensure an upward flow of air in said air reservoir, under compresssion; and
         a dispensing construction, in mechanical communication with said handle, for sealing said liquid container when said handle is not being used, and for dispensing a predetermined volume of liquid, when said handle compresses said air sac;

pressing said handle, thus activating said cam system, for compressing a lower portion of said body somewhat before an upper portion, to ensure an upward flow of air in said air reservoir, under compresssion;

simultaneously with said activating said cam system, compressing a spring, thus opening an air valve leading from said resilient sac, for allowing entry of air into said liquid container, by the pressure of said pressing; and simultaneously with said opening an air valve, opening a liquid channel, from an inner distal portion of said liquid container to a dispensing spout, for dispensing liquid, forced out by said entry of air.

29. The method of claim 28 and further including sealing said liquid container with an inflatable plug.

30. The method of claim 28 and further including locking said spring, when said device is not being used.

* * * * *